US009905225B2

(12) United States Patent
Koganei et al.

(10) Patent No.: US 9,905,225 B2
(45) Date of Patent: Feb. 27, 2018

(54) VOICE RECOGNITION PROCESSING DEVICE, VOICE RECOGNITION PROCESSING METHOD, AND DISPLAY DEVICE

(71) Applicant: Panasonic Intellectual Property Management Co., Ltd., Osaka (JP)

(72) Inventors: Tomohiro Koganei, Osaka (JP); Tomohiro Konuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/023,385

(22) PCT Filed: Dec. 22, 2014

(86) PCT No.: PCT/JP2014/006367
§ 371 (c)(1),
(2) Date: Mar. 20, 2016

(87) PCT Pub. No.: WO2015/098079
PCT Pub. Date: Jul. 2, 2015

(65) Prior Publication Data
US 2016/0210966 A1    Jul. 21, 2016

(30) Foreign Application Priority Data

Dec. 26, 2013 (JP) .................... 2013-268669

(51) Int. Cl.
*G10L 15/02* (2006.01)
*G10L 15/04* (2013.01)
(Continued)

(52) U.S. Cl.
CPC ............ *G10L 15/22* (2013.01); *G10L 15/083* (2013.01); *G10L 15/32* (2013.01);
(Continued)

(58) Field of Classification Search
CPC ....... G10L 15/22; G10L 15/083; G10L 15/32; H04N 21/42203; H04N 2015/221;
(Continued)

(56) References Cited

U.S. PATENT DOCUMENTS

| 6,718,307 B1 | 4/2004 | Buil et al. |
| 2003/0008633 A1* | 1/2003 | Bartosik ................. G10L 15/26 455/406 |

(Continued)

FOREIGN PATENT DOCUMENTS

| EP | 2675180 | 12/2013 |
| JP | 2000-356999 | 12/2000 |

(Continued)

OTHER PUBLICATIONS

International Search Report of PCT Application No. PCT/JP2014/006367 dated Mar. 17, 2015.

(Continued)

*Primary Examiner* — Chan Park
*Assistant Examiner* — Stephen Brinich
(74) *Attorney, Agent, or Firm* — McDermott Will & Emery LLP (57) ABSTRACT

A voice recognition processing apparatus includes a voice acquirer, a first voice recognizer, a second voice recognizer, a sorter, a storage device, and a processor. The voice acquirer acquires a voice uttered by a user and outputs voice information. The first voice recognizer converts the voice information into first information. The second voice recognizer converts the voice information into second information. The sorter sorts third information and fourth information from the second information. The storage device stores the first information, the third information, and the fourth information. The processor performs processing based on the first information, the third information, and the fourth (Continued)

information. If there are one or two pieces of missing information in the first information, the third information, and the fourth information, the processor complements the missing information by using information stored in the storage device and performs processing.

9 Claims, 7 Drawing Sheets

(51) Int. Cl.
G10L 15/22 (2006.01)
G10L 15/32 (2013.01)
G10L 15/08 (2006.01)
H04N 21/422 (2011.01)

(52) U.S. Cl.
CPC . H04N 21/42203 (2013.01); H04N 21/42204 (2013.01); G10L 2015/088 (2013.01); G10L 2015/223 (2013.01)

(58) Field of Classification Search
CPC ........... H04N 15/222; H04N 2015/223; H04N 2015/2235; H04N 2015/2236; H04N 2015/2237; H04N 2015/2238; H04N 15/24; H04N 15/26; H04N 15/08; H04N 15/30; H04N 15/34; H04N 21/42204; H04N 21/42206
USPC .......................... 704/246–250, 231–240, 243
See application file for complete search history.

(56) References Cited

U.S. PATENT DOCUMENTS

| 2005/0143978 A1* | 6/2005 | Martin ................... G10L 25/78 704/208 |
| 2007/0203699 A1 | 8/2007 | Nagashima |
| 2009/0144056 A1* | 6/2009 | Aizenbud-Reshef .. G06K 9/723 704/228 |
| 2010/0057450 A1 | 3/2010 | Koll |
| 2010/0131264 A1* | 5/2010 | Ljolje .................... G06F 17/27 704/9 |
| 2011/0238415 A1 | 9/2011 | Koll |
| 2012/0296644 A1 | 11/2012 | Koll |

FOREIGN PATENT DOCUMENTS

| JP | 2001-249685 | 9/2001 |
| JP | 2005-059185 | 3/2005 |
| JP | 2007-226642 | 9/2007 |
| JP | 4812941 B | 11/2011 |
| JP | 2012-501480 | 1/2012 |
| JP | 2013-205523 | 10/2013 |
| WO | 2010/025440 | 3/2010 |
| WO | 2013/168988 | 11/2013 |

OTHER PUBLICATIONS

The Extended European Search Report dated Dec. 20, 2016 for the related European Patent Application No. 14874773.6.

Hyo-Jung Oh et al: "An Intelligent TV interface based on Statistical Dialogue Management", IEEE Transactions on Consumer Electronics, IEEE Service Center, New York, NY, US, vol. 53, No. 4, Nov. 1, 2007 (Nov. 1, 2007), pp. 1602-1607, XP011199938.

* cited by examiner

VOICE RECOGNITION PROCESSING DEVICE, VOICE RECOGNITION PROCESSING METHOD, AND DISPLAY DEVICE

CROSS-REFERENCE TO RELATED APPLICATIONS

This application is a U.S. national stage application of the PCT International Application No. PCT/JP2014/006367 filed on Dec. 22, 2014, which claims the benefit of foreign priority of Japanese patent application 2013-268669 filed on Dec. 26, 2013, the contents all of which are incorporated herein by reference.

TECHNICAL FIELD

The present disclosure relates to voice recognition processing apparatuses, voice recognition processing methods, and display apparatuses that operate by recognizing a voice uttered by a user.

BACKGROUND ART

Patent Literature 1 discloses a voice input apparatus that has a voice recognition function. This voice input apparatus is configured to receive a voice uttered by a user, to recognize (voice recognition) a command indicated by the voice of the user by analyzing the received voice, and to control a device in accordance with the voice-recognized command. That is, the voice input apparatus of Patent Literature 1 is capable of performing voice recognition on the voice arbitrarily uttered by the user, and controlling the device in accordance with the command that is a result of the voice recognition.

For example, a user who uses this voice input apparatus can select hypertext displayed on a browser by using the voice recognition function of this voice input apparatus while operating the browser on an apparatus such as a television receiver (hereinafter referred to as "television") and a PC (Personal Computer). In addition, the user can also use this voice recognition function to perform a search on a web site (search site) that provides a search service.

CITATION LIST

Patent Literature

PTL 1: Japanese patent No. 4812941

SUMMARY

The present disclosure provides the voice recognition processing apparatus and voice recognition processing method for improving user operativity.

A voice recognition processing apparatus according to the present disclosure includes a voice acquirer, a first voice recognizer, a second voice recognizer, a sorter, a storage device, and a processor. The voice acquirer is configured to acquire a voice uttered by a user and to output voice information. The first voice recognizer is configured to convert the voice information into first information. The second voice recognizer is configured to convert the voice information into second information. The sorter is configured to sort third information and fourth information from the second information. The storage device is configured to store the first information, the third information, and the fourth information. The processor is configured to perform processing based on the first information, the third information, and the fourth information. The processor is configured, if there are one or two pieces of missing information in the first information, the third information, and the fourth information, to complement the missing information by using information stored in the storage device and to perform processing.

The voice recognition processing method according to the present disclosure includes: acquiring a voice uttered by a user and converting the voice into voice information; converting the voice information into first information; converting the voice information into second information; sorting third information and fourth information from the second information; storing the first information, the third information, and the fourth information in a storage device; performing processing based on the first information, the third information, and the fourth information; and when there are one or two pieces of missing information in the first information, the third information, and the fourth information, complementing the missing information by using information stored in the storage device.

A display apparatus according to the present disclosure includes a voice acquirer, a first voice recognizer, a second voice recognizer, a sorter, a storage device, a processor, and a display device. The voice acquirer is configured to acquire a voice uttered by a user and to output voice information. The first voice recognizer is configured to convert the voice information into first information. The second voice recognizer is configured to convert the voice information into second information. The sorter is configured to sort third information and fourth information from the second information. The storage device is configured to store the first information, the third information, and the fourth information. The processor is configured to perform processing based on the first information, the third information, and the fourth information. The display device is configured to display a processing result by the processor. The processor is configured, if there are one or two pieces of missing information in the first information, the third information, and the fourth information, to complement the missing information by using information stored in the storage device and to perform processing.

The voice recognition processing apparatus according to the present disclosure can improve operativity when the user performs voice operation.

DESCRIPTION OF EMBODIMENTS

Exemplary embodiments will be described in detail below with reference to the drawings as needed. However, a description that is more detailed than necessary may be omitted. For example, a detailed description of an already well-known item and a repeated description of substantially identical components may be omitted. This is for avoiding the following description from becoming unnecessarily redundant and for making the description easier for a person skilled in the art to understand.

It is to be noted that the accompanying drawings and the following description are provided in order for a person skilled in the art to fully understand the present disclosure, and are not intended to limit the subject described in the appended claims.

First Exemplary Embodiment

A first exemplary embodiment will be described below with reference to FIG. 1 to FIG. 7. It is to be noted that although television receiver (television) 10 is cited in the present exemplary embodiment as an example of a display apparatus including a voice recognition processing apparatus, the display apparatus is not limited to television 10. For example, the display apparatus may be an apparatus such as a PC and a tablet terminal.

[1-1. Configuration]

Figure 1:
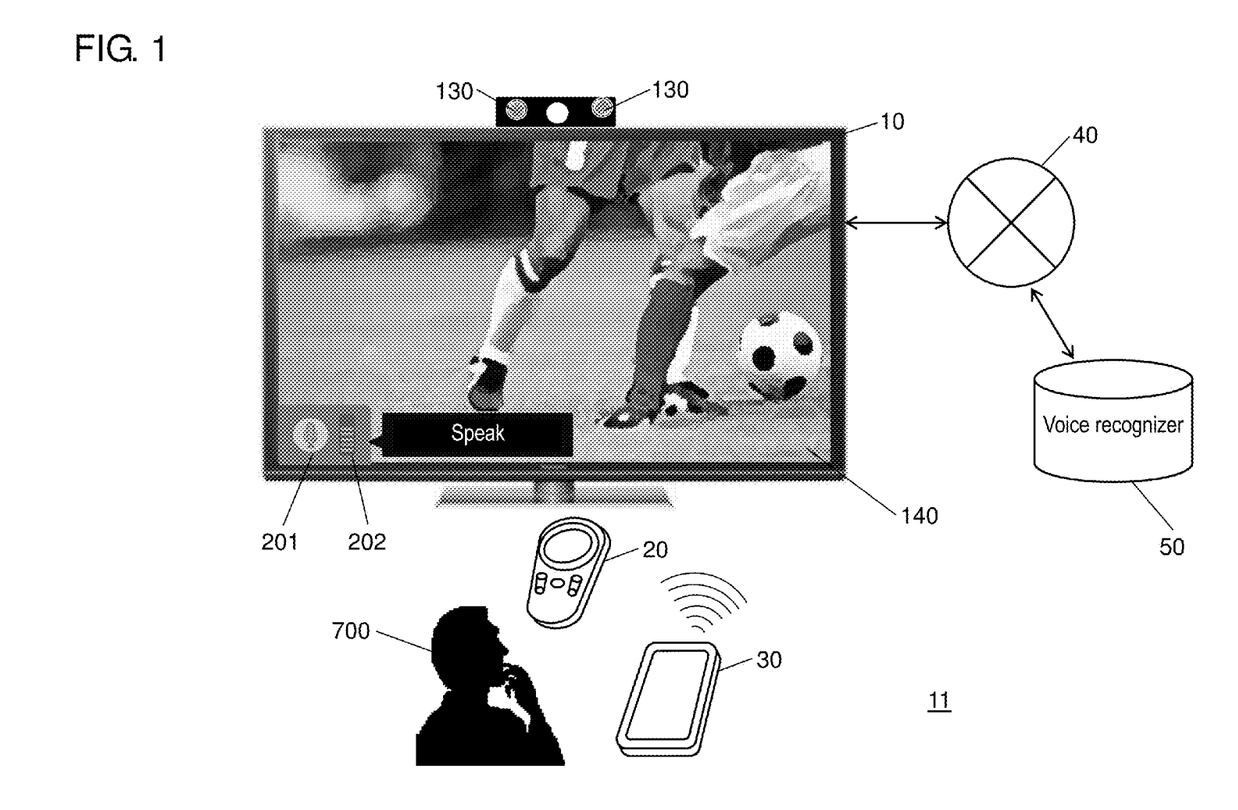
FIG. 1 is a diagram schematically illustrating a voice recognition processing system according to a first exemplary embodiment.

FIG. 1 is a diagram schematically illustrating voice recognition processing system 11 according to the first exemplary embodiment. In the present exemplary embodiment, television 10 that is an example of the display apparatus incorporates the voice recognition processing apparatus.

Voice recognition processing system 11 according to the present exemplary embodiment includes television 10 and voice recognizer 50. In addition, voice recognition processing system 11 may also include at least one of remote controller (hereinafter also referred to as "remocon") 20 and mobile terminal 30.

When the voice recognition processing apparatus starts in television 10, voice recognition icon 201 and indicator 202 indicating volume of a collected voice are displayed on display device 140 of television 10, together with an image based on signals such as an input image signal and a received broadcast signal. This is for indicating user 700 that an operation (hereinafter referred to as "voice operation") of television 10 based on a voice of user 700 is available and for prompting user 700 to utter a voice.

When user 700 utters a voice, the voice will be collected by a microphone incorporated in remote controller 20 or in mobile terminal 30 used by user 700, and will be transferred to television 10. Then, the voice uttered by user 700 undergoes voice recognition by the voice recognition processing apparatus incorporated in television 10. In television 10, control of television 10 is performed in accordance with a result of the voice recognition.

Television 10 may include built-in microphone 130. In this case, when user 700 utters a voice toward built-in microphone 130 included in television 10, the voice will be collected by built-in microphone 130, and undergo voice recognition by the voice recognition processing apparatus.

Therefore, it is also possible to configure voice recognition processing system 11 to include neither remote controller 20 nor mobile terminal 30.

In addition, television 10 is connected to voice recognizer 50 via network 40. This allows communication between television 10 and voice recognizer 50.

Figure 2:
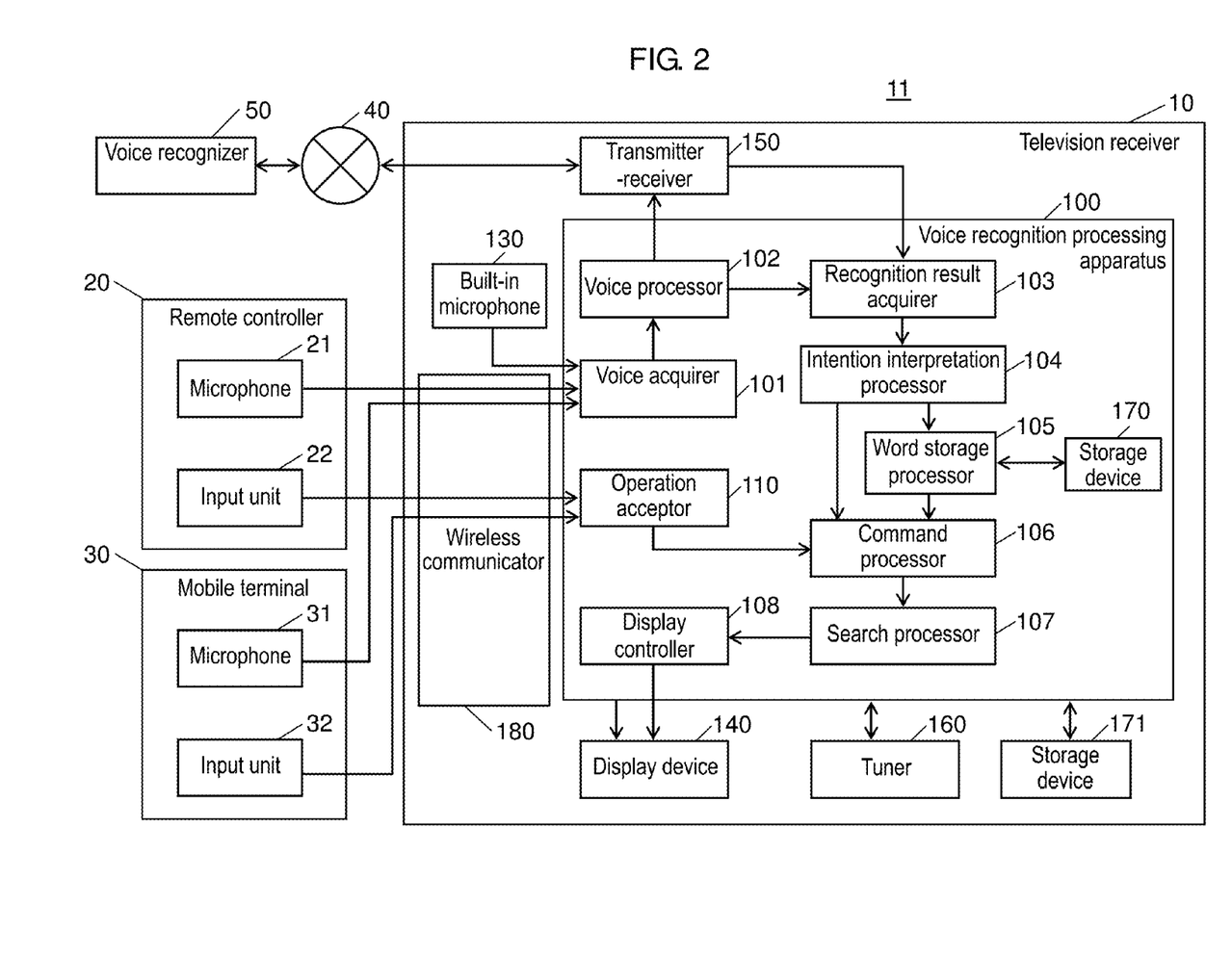
FIG. 2 is a block diagram illustrating a configuration example of the voice recognition processing system according to the first exemplary embodiment.

FIG. 2 is a block diagram illustrating a configuration example of voice recognition processing system 11 according to the first exemplary embodiment.

Television 10 includes voice recognition processing apparatus 100, display device 140, transmitter-receiver 150, tuner 160, storage device 171, built-in microphone 130, and wireless communicator 180.

Voice recognition processing apparatus 100 is configured to acquire the voice uttered by user 700 and to analyze the acquired voice. Voice recognition processing apparatus 100 is configured to recognize a keyword and command the voice indicates and to control television 10 in accordance with a result of recognition. The specific configuration of voice recognition processing apparatus 100 will be described later.

Built-in microphone 130 is a microphone configured to collect voice that mainly comes from a direction facing a display surface of display device 140. That is, a sound-collecting direction of built-in microphone 130 is set so as to collect the voice uttered by user 700 who faces display device 140 of television 10. Built-in microphone 130 can collect the voice uttered by user 700 accordingly. Built-in microphone 130 may be provided inside an enclosure of television 10, and as illustrated in an example of FIG. 1, may be installed outside the enclosure of television 10.

Remote controller 20 is a controller for user 700 to perform remote controller of television 10. In addition to a general configuration required for remote controller of television 10, remote controller 20 includes microphone 21 and input unit 22. Microphone 21 is configured to collect the voice uttered by user 700 and to output a voice signal. Input unit 22 is configured to accept an input operation performed by user 700 manually, and to output an input signal in response to the input operation. Input unit 22, which is, for example, a touchpad, may also be a keyboard or a button. The voice signal generated from the voice collected by microphone 21, or the input signal generated by user 700 performing the input operation on input unit 22 is wirelessly transmitted to television 10 by, for example, infrared rays and electromagnetic waves.

Display device 140, which is, for example, a liquid crystal display, may also be a display such as a plasma display and an organic EL (Electro Luminescence) display. Display device 140 is controlled by display controller 108, and displays an image based on signals such as an external input image signal and a broadcast signal received by tuner 160.

Transmitter-receiver 150 is connected to network 40, and is configured to communicate via network 40 with an external device (for example, voice recognizer 50) connected to network 40.

Tuner 160 is configured to receive a television broadcast signal of terrestrial broadcasting or satellite broadcasting via an antenna (not illustrated). Tuner 160 may be configured to receive the television broadcast signal transmitted via a private cable.

Storage device 171, which is, for example, a nonvolatile semiconductor memory, may be a device such as a volatile semiconductor memory and a hard disk. Storage device 171 stores information (data), a program, and the like used for control of each unit of television 10.

Mobile terminal 30 is, for example, a smart phone, on which software for performing remote controller of television 10 can run. Therefore, in voice recognition processing system 11 according to the present exemplary embodiment, mobile terminal 30 on which the software is running can be used for remote controller of television 10. Mobile terminal 30 includes microphone 31 and input unit 32. Microphone 31 is a microphone incorporated in mobile terminal 30. In a similar manner to microphone 21 included in remote controller 20, microphone 31 is configured to collect the voice uttered by user 700 and to output a voice signal. Input unit 32 is configured to accept an input operation performed by user 700 manually, and to output an input signal in response to the input operation. Input unit 32, which is, for example, a touch panel, may also be a keyboard or a button. Mobile terminal 30 on which the software is running wirelessly transmits, to television 10, the voice signal generated by the voice collected by microphone 31, or the input signal generated by user 700 performing the input operation on input unit 32 by, for example, infrared rays and electromagnetic waves, in a similar manner to remote controller 20.

Television 10, and remote controller 20 or mobile terminal 30 are connected by wireless communications, such as, for example, wireless LAN (Local Area Network) and Bluetooth (registered trademark).

Network 40, which is, for example, the Internet, may be another network.

Voice recognizer 50 is a server (server on a cloud) connected to television 10 via network 40. Voice recognizer 50 receives the voice information transmitted from television 10, and converts the received voice information into a character string. It is to be noted that this character string may be a plurality of characters, and may be one character. Then, voice recognizer 50 transmits character string information that indicates the converted character string to television 10 via network 40 as a result of voice recognition.

Voice recognition processing apparatus 100 includes voice acquirer 101, voice processor 102, recognition result acquirer 103, intention interpretation processor 104, word storage processor 105, command processor 106, search processor 107, display controller 108, operation acceptor 110, and storage device 170.

Storage device 170, which is, for example, a nonvolatile semiconductor memory, may be a device such as a volatile semiconductor memory and a hard disk. Storage device 170 is controlled by word storage processor 105, and can write and read data arbitrarily. In addition, storage device 170 also stores information such as information that is referred to by voice processor 102 (for example, "voice-command" association information described later). The "voice-command" association information is information in which voice information is associated with a command. It is to be noted that storage device 170 and storage device 171 may be integrally formed.

Voice acquirer 101 acquires the voice signal generated from the voice uttered by user 700. Voice acquirer 101 may acquire the voice signal generated from the voice uttered by user 700 from built-in microphone 130 of television 10, or from microphone 21 incorporated in remote controller 20, or microphone 31 incorporated in mobile terminal 30 via wireless communicator 180. Then, voice acquirer 101 converts the voice signal into voice information that can be used for various types of downstream processing, and outputs the voice information to voice processor 102. It is to be noted that when the voice signal is a digital signal, voice acquirer 101 may use the voice signal as it is as the voice information.

Voice processor 102 is an example of "a first voice recognizer". Voice processor 102 is configured to convert the voice information into command information that is an example of "first information". Voice processor 102 performs "command recognition processing". "The command recognition processing" is processing for determining whether the voice information acquired from voice acquirer 101 includes a preset command, and for specifying the command when the voice information includes the command. Specifically, voice processor 102 refers to the "voice-command" association information previously stored in storage device 170, based on the voice information acquired from voice acquirer 101. The "voice-command" association information is an association table in which the voice information is associated with a command that is instruction information for television 10. The command includes a plurality of types, and each command is associated with a voice information item different from one another. Voice processor 102 refers to the "voice-command" association information. If the command included in the voice information acquired from voice acquirer 101 can be specified, voice processor 102 outputs information (command information) representing the command to recognition result acquirer 103 as a result of voice recognition.

In addition, voice processor 102 transmits the voice information acquired from voice acquirer 101, from transmitter-receiver 150 via network 40 to voice recognizer 50.

Voice recognizer 50 is an example of "a second voice recognizer". Voice recognizer 50 is configured to convert the voice information into character string information that is an example of "second information", and performs "keyword recognition processing". On receipt of the voice information transmitted from television 10, voice recognizer 50 separates the voice information into clauses in order to distinguish a keyword from a word other than the keyword (for example, a particle), and converts each clause into a character string (hereinafter referred to as "dictation"). Then, voice recognizer 50 transmits information on the character string after dictation (character string information) to television 10 as a result of voice recognition. Voice recognizer 50 may acquire voice information other than commands from the received voice information, or may convert voice information other than commands from the received voice information into a character string and reply the character string. Alternatively, television 10 may transmit voice information except commands to voice recognizer 50.

Recognition result acquirer 103 acquires the command information as a result of voice recognition from voice processor 102. In addition, recognition result acquirer 103 acquires the character string information as a result of voice recognition from voice recognizer 50 via network 40 and transmitter-receiver 150.

Intention interpretation processor 104 is an example of "a sorter". Intention interpretation processor 104 is configured to sort reserved word information that is an example of "third information", and free word information that is an example of "fourth information" from the character string information. On acquisition of the command information and the character string information from recognition result acquirer 103, intention interpretation processor 104 sorts the "free word" and the "reserved word" from the character string information. Then, based on the sorted free word, reserved word, and command information, intention interpretation processor 104 performs intention interpretation for specifying intention of the voice operation uttered by user 700. Details of this operation will be described later. Intention interpretation processor 104 outputs the intention-interpreted command information to command processor 106. In addition, intention interpretation processor 104 outputs the free word information representing the free word, the reserved word information representing the reserved word, and the command information, to word storage processor 105. Intention interpretation processor 104 may output the free word information and reserved word information to command processor 106.

Word storage processor 105 stores, in storage device 170, the command information, free word information, and reserved word information that are output from intention interpretation processor 104.

Command processor 106 is an example of "a processor". Command processor 106 is configured to perform processing based on the command information, reserved word information, and free word information. Command processor 106 performs command processing corresponding to the command information that is intention-interpreted by intention interpretation processor 104. In addition, command processor 106 performs command processing corresponding to the user operation accepted by operation acceptor 110.

Furthermore, command processor 106 may perform new command processing based on one or two of the command information, free word information, and reserved word information stored in storage device 170 by word storage processor 105. That is, command processor 106 is configured, if there are one or two pieces of missing information in the command information, reserved word information, and free word information, to complement the missing information using information stored in storage device 170, and to perform command processing. Details of this processing will be described later.

Search processor 107 is an example of "a processor". Search processor 107 is configured, if the command information is a search command, to perform search processing based on the reserved word information and the free word information. If the command information corresponds to a search command associated with a preset application, search processor 107 performs a search using the application based on the free word information and the reserved word information.

If, for example, the command information is a search command associated with an Internet search application that is one of the preset applications, search processor 107 performs a search using the Internet search application based on the free word information and the reserved word information.

Alternatively, if the command information is a search command associated with a program guide application that is one of the preset applications, search processor 107 performs a search using the program guide application based on the free word information and the reserved word information.

In addition, if the command information is not a search command associated with the preset applications, search processor 107 performs a search based on the free word information and the reserved word information using all applications (searchable applications) capable of performing a search based on the free word information and the reserved word information.

It is to be noted that search processor 107 is configured, if there are one or two pieces of missing information in the reserved word information and free word information, to complement the missing information by using information stored in storage device 170 and to perform search processing. In addition, if the missing information is command information and last command processing is search processing by search processor 107, search processor 107 performs the search processing again.

Display controller 108 displays a result of the search performed by search processor 107, on display device 140. For example, display controller 108 displays a result of a keyword search using the Internet search application, a result of a keyword search using the program guide application, or a result of a keyword search using the searchable application, on display device 140.

Operation acceptor 110 receives an input signal generated by an input operation performed by user 700 in input unit 22 of remote controller 20, or an input signal generated by an input operation performed by user 700 in input unit 32 of mobile terminal 30, from remote controller 20 or mobile terminal 30, respectively, via wireless communicator 180. In this way, operation acceptor 110 accepts the operation (user operation) performed by user 700.

[1-2. Operation]

Next, operations of voice recognition processing apparatus 100 of television 10 according to the present exemplary embodiment will be described.

First, methods for starting voice recognition processing by voice recognition processing apparatus 100 of television 10 will be described. The methods for starting voice recognition processing mainly include the following two methods.

A first method for starting is as follows. In order to start voice recognition processing, user 700 presses a microphone button (not illustrated) that is one of input unit 22 provided in remote controller 20. When user 700 presses the microphone button of remote controller 20, in television 10, operation acceptor 110 accepts that the microphone button of remote controller 20 is pressed. Then, television 10 alters volume of a speaker (not illustrated) of television 10 into preset volume. This volume is sufficiently low volume to avoid disturbance of voice recognition by microphone 21. Then, when the volume of the speaker of television 10 becomes the preset volume, voice recognition processing apparatus 100 starts voice recognition processing. At this time, if the volume from the speaker is equal to or lower than the preset volume, television 10 does not need to perform the above volume adjustment, and leaves the volume as it is.

It is to be noted that this method can also use mobile terminal 30 (for example, a smart phone including a touch panel) instead of remote controller 20. In this case, user 700 starts software (software for performing voice operation of television 10) included in mobile terminal 30, and presses the microphone button displayed on the touch panel by the software running. This user operation corresponds to a user operation of pressing the microphone button of remote controller 20. This causes voice recognition processing apparatus 100 to start voice recognition processing.

A second method for starting is as follows. User 700 utters a voice (for example, "Start voice operation") representing a command (start command) to start preset voice recognition processing, to built-in microphone 130 of television 10. When voice recognition processing apparatus 100 recognizes that the voice collected by built-in microphone 130 is the preset start command, television 10 alters the volume of the speaker into the preset volume in a similar manner to the above method, and voice recognition processing by voice recognition processing apparatus 100 starts. It is to be noted that the above-described methods may be combined to define the method for starting voice recognition processing.

It is assumed that these types of control in television 10 are performed by a controller (not illustrated) that controls each block of television 10.

When voice recognition processing by voice recognition processing apparatus 100 starts, in order to prompt user 700 to utter a voice, display controller 108 displays, on an image display surface of display device 140, voice recognition icon 201 indicating that voice recognition processing has started and that voice operation by user 700 has become available, and indicator 202 indicating volume of a voice that is being collected.

It is to be noted that display controller 108 may display, on display device 140, a message indicating that voice recognition processing has started, instead of voice recognition icon 201. Alternatively, display controller 108 may output a message indicating that voice recognition processing has started, with a voice from the speaker.

It is to be noted that voice recognition icon 201 and indicator 202 are not limited to a design illustrated in FIG. 1. Any design may be used as long as an intended effect is obtained.

Next, voice recognition processing performed by voice recognition processing apparatus 100 of television 10 will be described.

In the present exemplary embodiment, voice recognition processing apparatus 100 performs a first type and a second type of voice recognition processing. The first type is voice recognition processing (command recognition processing) for recognizing a voice corresponding to a preset command. The second type is voice recognition processing (keyword recognition processing) for recognizing a keyword other than the preset command.

As described above, the command recognition processing is performed by voice processor 102. Voice processor 102 compares voice information based on a voice uttered by user 700 to television 10 with "voice-command" association information previously stored in storage device 170. Then, when the voice information includes a command registered in the "voice-command" association information, voice processor 102 specifies the command. It is to be noted that various commands for operating television 10 are registered in the "voice-command" association information, and for example, an operation command for free word search is also registered.

The keyword recognition processing is performed using voice recognizer 50 connected to television 10 via network 40, as described above. Voice recognizer 50 acquires the voice information from television 10 via network 40. Then, voice recognizer 50 separates the acquired voice information into clauses, and isolates a keyword from a word other than the keyword (for example, particle). In this way, voice recognizer 50 performs dictation. When performing dictation, voice recognizer 50 uses a database that associates the voice information with a character string (including one character). Voice recognizer 50 compares the acquired voice information with the database to isolate a keyword from a word other than the keyword, and converts each word into a character string.

It is to be noted that, in the present exemplary embodiment, voice recognizer 50 is configured to receive from television 10 all the voices (voice information) acquired by voice acquirer 101, to perform dictation of all pieces of the voice information, and to transmit all pieces of the resulting character string information to television 10. However, voice processor 102 of television 10 may be configured to transmit the voice information other than the command recognized using the "voice-command" association information to voice recognizer 50.

Next, the keyword recognition processing will be described with reference to FIG. 3.

Figure 3:
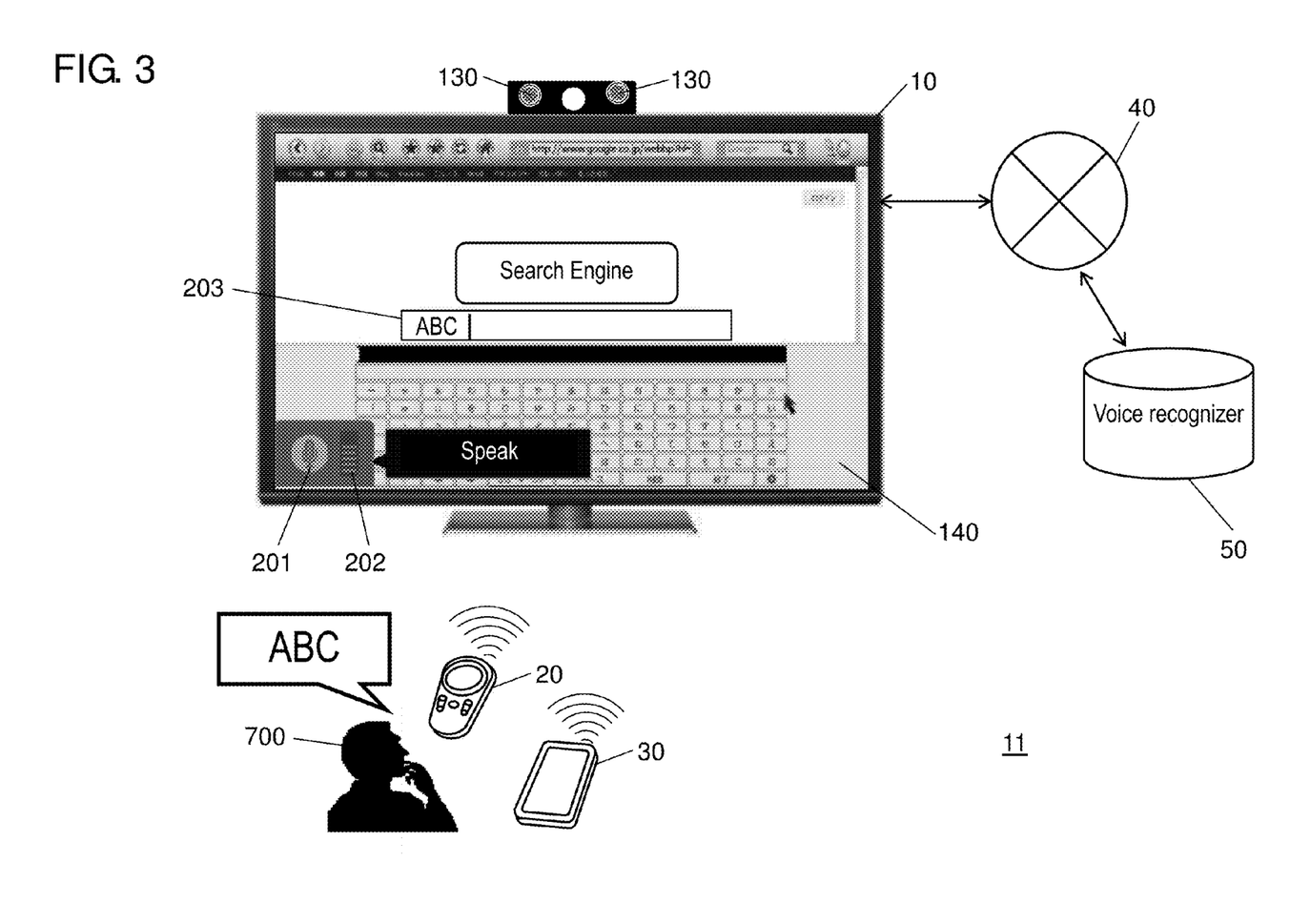
FIG. 3 is a diagram illustrating an outline of dictation performed by the voice recognition processing system according to the first exemplary embodiment.

FIG. 3 is a diagram illustrating an outline of dictation performed by voice recognition processing system 11 according to the first exemplary embodiment.

FIG. 3 illustrates a state where a web browser is displayed on display device 140 of television 10. For example, in a case where user 700 performs a search (keyword search) with a keyword using Internet search applications of the web browser, when voice recognition processing starts in voice recognition processing apparatus 100, an image illustrated in FIG. 3 as an example is displayed on display device 140.

Entry field 203 is an area for entry of a keyword used for the search on the web browser. While a cursor is displayed in entry field 203, user 700 can enter a keyword in entry field 203.

When user 700 utters a voice in this state toward remote controller 20, mobile terminal 30, or built-in microphone 130 of television 10, a voice signal generated by the voice is input into voice acquirer 101, and is converted into voice information. Then, the voice information is transmitted from television 10 via network 40 to voice recognizer 50. For example, when user 700 utters, "ABC", voice information based on this voice is transmitted from television 10 to voice recognizer 50.

Voice recognizer 50 compares the voice information received from television 10 with the database to convert the voice information into a character string. Then, as a result of voice recognition of the received voice information, voice recognizer 50 transmits information on the character string (character string information) via network 40 to television 10. Voice recognizer 50 compares, when the received voice information is generated from the voice "ABC", the voice information with the database to convert the voice information into a character string "ABC", and transmits the character string information to television 10.

On receipt of the character string information from voice recognizer 50, based on the character string information, television 10 causes recognition result acquirer 103, intention interpretation processor 104, command processor 106, and display controller 108 to operate and to display the character string corresponding to the character string information on entry field 203. For example, on receipt of the character string information corresponding to the character string "ABC" from voice recognizer 50, television 10 displays the character string "ABC" in entry field 203.

Then, the web browser that is displayed on display device 140 of television 10 performs keyword search using the character string displayed in entry field 203.

Next, keyword single search processing and keyword associative search processing performed by voice recognition processing apparatus 100 according to the present exemplary embodiment will be described with reference to FIG. 4 to FIG. 7.

Figure 4:
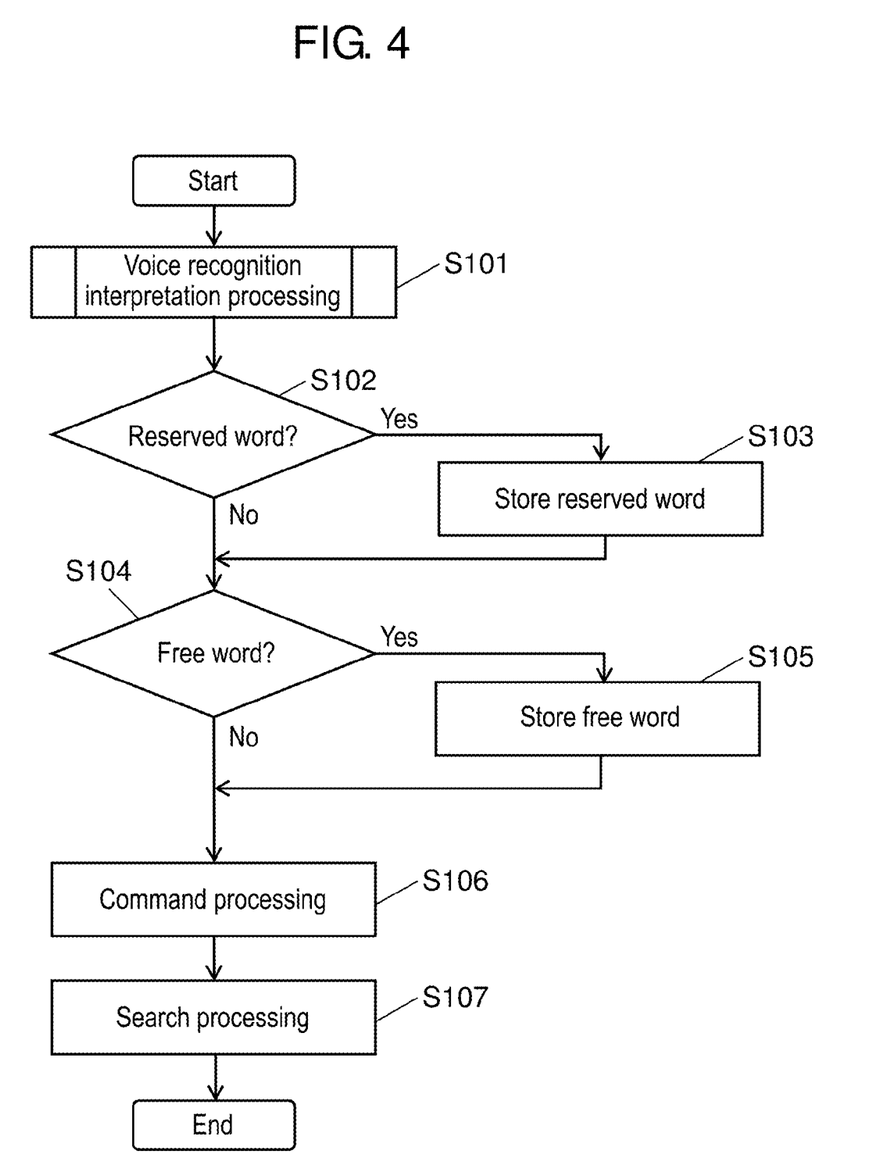
FIG. 4 is a flow chart illustrating an operation example of keyword single search processing performed by a voice recognition processing apparatus according to the first exemplary embodiment.

FIG. 4 is a flow chart illustrating an operation example of the keyword single search processing performed by voice recognition processing apparatus 100 according to the first exemplary embodiment.

Figure 5:
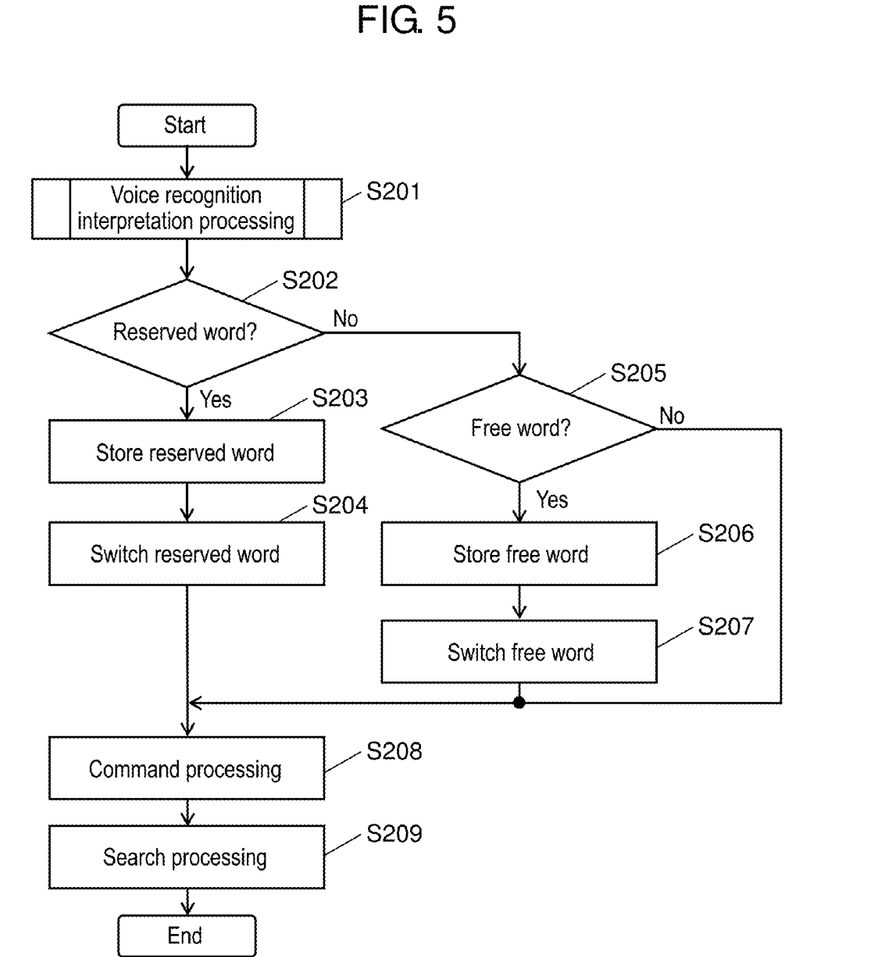
FIG. 5 is a flow chart illustrating an operation example of keyword associative search processing performed by the voice recognition processing apparatus according to the first exemplary embodiment.

FIG. 5 is a flow chart illustrating an operation example of the keyword associative search processing performed by voice recognition processing apparatus 100 according to the first exemplary embodiment.

Figure 6:
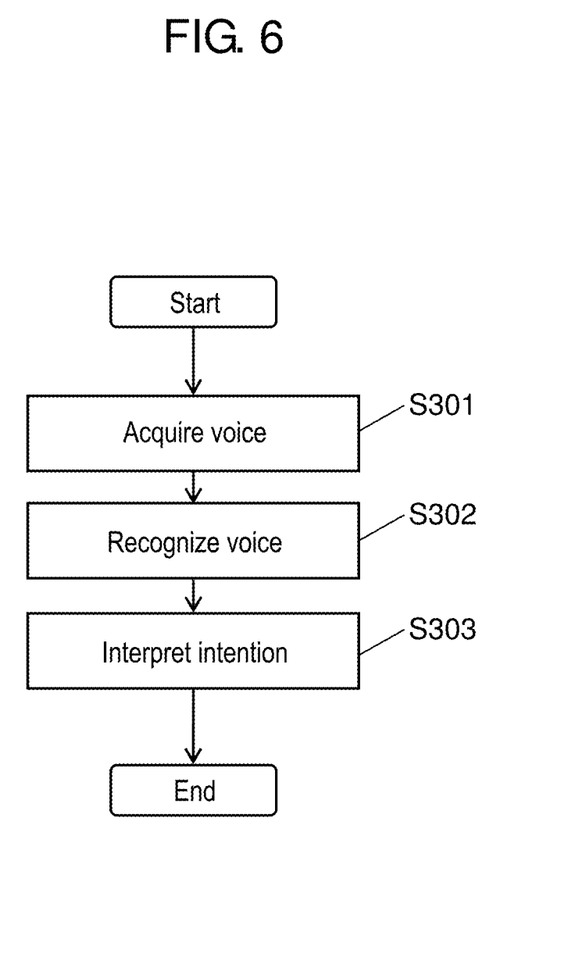
FIG. 6 is a flow chart illustrating an operation example of voice recognition interpretation processing performed by the voice recognition processing apparatus according to the first exemplary embodiment.

FIG. 6 is a flow chart illustrating an operation example of voice recognition interpretation processing performed by voice recognition processing apparatus 100 according to the first exemplary embodiment. The flow chart illustrated in FIG. 6 is a flow chart illustrating details of a voice recognition interpretation processing step in search processing illustrated in each of FIG. 4 and FIG. 5.

Figure 7:
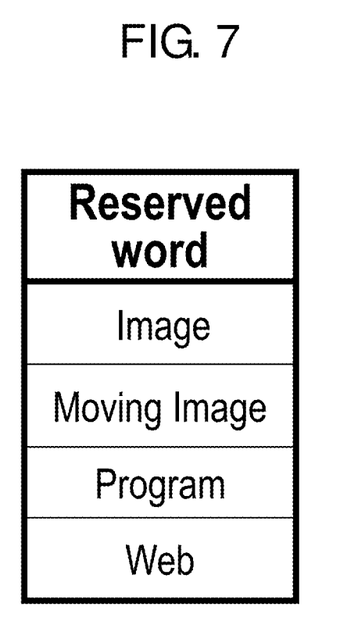
FIG. 7 is a diagram schematically illustrating an example of a reserved word table of the voice recognition processing apparatus according to the first exemplary embodiment.

FIG. 7 is a diagram schematically illustrating an example of a reserved word table for voice recognition processing apparatus 100 according to the first exemplary embodiment.

Voice recognition processing apparatus 100 according to the present exemplary embodiment performs substantially identical processing between voice recognition interpretation processing (step S101) of the keyword single search processing illustrated in FIG. 4 and voice recognition interpretation processing (step S201) of the keyword associative search processing illustrated in FIG. 5. First, this voice recognition interpretation processing will be described with reference to FIG. 6.

As described above, in television 10, an operation of user 700, for example, pressing the microphone button of remote controller 20 causes voice recognition processing apparatus 100 to start voice recognition processing.

When user 700 utters a voice in this state, the voice of user 700 is converted into a voice signal by built-in microphone 130, microphone 21 of remote controller 20, or microphone 31 of mobile terminal 30, and the voice signal is input into voice acquirer 101. In this way, voice acquirer 101 acquires the voice signal of user 700 (step S301).

Voice acquirer 101 converts the acquired voice signal of user 700 into voice information that can be used for various types of downstream processing. When user 700 utters, for example, "Search for image of ABC", voice acquirer 101 outputs voice information based on the voice.

Voice processor 102 compares the voice information that is output from voice acquirer 101 with "voice-command" association information previously stored in storage device 170. Then, voice processor 102 examines whether the voice information that is output from voice acquirer 101 includes information corresponding to commands registered in the "voice-command" association information (step S302).

For example, when the voice information that is output from voice acquirer 101 includes voice information based on a term "search" uttered by user 700, and when "search" has been registered in the "voice-command" association information as command information, voice processor 102 determines that the command "search" is included in the voice information.

The "voice-command" association information includes registered commands required for operations such as an operation of television 10 and an operation of an application displayed on display device 140. These pieces of command information include command information corresponding to voice information, for example, "search", "channel up", "voice up", "playback", "stop", "convert word", and "display character".

It is to be noted that the "voice-command" association information can be updated by operations such as addition and deletion of command information. For example, user 700 can add new command information to the "voice-command" association information. Alternatively, new command information can also be added to the "voice-command" association information via network 40. This allows voice recognition processing apparatus 100 to perform voice recognition processing in accordance with the latest "voice-command" association information.

In addition, in step S302, voice processor 102 transmits the voice information that is output from voice acquirer 101, from transmitter-receiver 150 via network 40 to voice recognizer 50.

Voice recognizer 50 converts the received voice information into a character string with a keyword being isolated from a word other than the keyword (for example, particle). For this purpose, voice recognizer 50 performs dictation in accordance with the received voice information.

Voice recognizer 50 compares a database that associates the keyword with the character string, with the received voice information. When the received voice information includes the keyword registered in the database, voice recognizer 50 selects the character string (including a word) corresponding to the keyword. In this way, voice recognizer 50 performs dictation and converts the received voice information into a character string. For example, when voice recognizer 50 receives voice information based on the voice "Search for image of ABC" uttered by user 700, voice recognizer 50 converts the voice information into character strings of "search", "for", "image", "of", and "ABC" by dictation. Voice recognizer 50 transmits character string information representing each converted character string via network 40 to television 10.

This database, which is included in voice recognizer 50, may be at another place on network 40. In addition, this database may be configured so that keyword information may be updated regularly or irregularly.

Recognition result acquirer 103 of television 10 acquires the command information that is output from voice processor 102 as a result of voice recognition, and the character string information transmitted from voice recognizer 50 as a result of voice recognition. Recognition result acquirer 103 then outputs the command information and the character string information to intention interpretation processor 104.

Based on the command information and the character string information acquired from recognition result acquirer 103, intention interpretation processor 104 performs intention interpretation for specifying an intention of a voice operation uttered by user 700 (step S303).

Intention interpretation processor 104 performs sorting of character string information for intention interpretation. Types of this sorting include a free word, a reserved word, and a command. When the character string information includes information that overlaps with the command information, intention interpretation processor 104 determines the information to be a command, and sorts the command. In addition, intention interpretation processor 104 sorts the reserved word from the character string information based on the reserved word table illustrated in FIG. 7 as an example. Intention interpretation processor 104 excludes character strings, such as a particle, that do not correspond to the keyword from remaining character string information to sort the free word.

For example, when acquiring the character string information such as "search", "for", "image", "of", and "ABC", and the command information representing "search", intention interpretation processor 104 sorts "ABC" as the free word, "image" as the reserved word, and "search" as the command. Since intention interpretation processor 104 performs such intention interpretation, voice recognition processing apparatus 100 can perform an operation in accordance with the intention of user 700 (intention of the voice operation uttered by user 700). For example, regarding the reserved word "image", voice recognition processing apparatus 100 can execute the command "search" using the free word "ABC".

It is to be noted that intention interpretation processor 104 compares the reserved word table illustrated in FIG. 7 as an example with the character string information. When the character string information includes a term registered in the reserved word table, intention interpretation processor 104 sorts the term as a reserved word from the character string information. The reserved word is, for example, a previously determined term, such as "image", "moving image", "program", and "Web", as illustrated in FIG. 7 as an example. However, the reserved word is not limited to these terms.

It is to be noted that intention interpretation processor 104 may perform intention interpretation using the character string included in the character string information, such as a particle.

In this way, intention interpretation processor 104 performs voice recognition interpretation processing (step S101 illustrated in FIG. 4 and step S201 illustrated in FIG. 5).

Next, the keyword single search processing according to the present exemplary embodiment will be described with reference to FIG. 4.

Based on the voice uttered by user 700, intention interpretation processor 104 performs voice recognition interpretation processing illustrated in FIG. 6 (step S101). Detailed description of step S101, which is overlapping, will be omitted.

Based on a processing result in step S101, intention interpretation processor 104 determines whether the reserved word information is included in the character string information (step S102).

When it is determined in step S102 that the reserved word information is not included (No), the processing goes to step S104.

When it is determined in step S102 that the reserved word information is included (Yes), word storage processor 105 stores the reserved word information in storage device 170 (step S103). In the aforementioned example, the reserved word information "image" is stored in storage device 170.

Based on the processing result in step S101, voice recognition processing apparatus 100 determines whether the free word information is included in the character string information (step S104).

When it is determined in step S104 that the free word information is not included (No), the processing goes to step S106.

When it is determined in step S104 that the free word information is included (Yes), word storage processor 105 stores the free word information in storage device 170 (step S105). In the aforementioned example, the free word information "ABC" is stored in storage device 170.

In addition, word storage processor 105 stores the command information in storage device 170.

Command processor 106 performs command processing based on the free word information, the reserved word information, and the command information (step S106).

On receipt of the command information from intention interpretation processor 104, and on receipt of the free word information and (or) reserved word information from word storage processor 105, command processor 106 executes a command based on the command information on each or both of the free word information and the reserved word information. It is to be noted that command processor 106 may receive the free word information and reserved word information from intention interpretation processor 104. In addition, command processor 106 may receive the command information from word storage processor 105.

It is to be noted that command processor 106 mainly performs command processing other than search. Examples of this command processing include channel change and volume change of television 10.

When "search" is included in the command information, search processor 107 performs search processing (step S107). In the aforementioned example, search processor 107 determines "image" as content to be searched based on the reserved word information "image", and performs image search using the free word information "ABC".

A search result in step S107 is displayed on display device 140 by display controller 108. In this way, the keyword single search processing is completed.

Next, the keyword associative search processing according to the present exemplary embodiment will be described with reference to FIG. 5.

The keyword associative search processing refers to processing, when user 700 performs search processing continuously, for performing a new search based on previous input information and new information to input, even without inputting again information that is input in a previous search.

It is to be noted that the present exemplary embodiment describes an example in which an input operation is performed by a voice uttered by user 700, but an input operation may be performed using input unit 22 (for example, a touchpad) of remote controller 20 or input unit 32 (for example, a touch panel) of mobile terminal 30.

The keyword associative search processing will be described below with reference to specific examples. It is assumed here that user 700 has first uttered, "Search for image of ABC", and a search for "image" by the free word of "ABC" has already been performed.

It is assumed that subsequently user 700 performs a new search for "moving image" using the free word of "ABC" identical to the free word used for the last image search. In this case, in the present exemplary embodiment, user 700 may omit utterance of the free word "ABC" that overlaps with the free word in the previous search. That is, user 700 just needs to utter, "Search for moving image".

Intention interpretation processor 104 performs voice recognition interpretation processing illustrated in FIG. 6 based on the voice uttered by user 700 (step S201). Detailed description of step S201, which is overlapping, will be omitted.

The voice information (for example, "Search for moving image") based on the voice uttered by the user is transmitted from voice recognition processing apparatus 100 via network 40 to voice recognizer 50. Voice recognizer 50 replies character string information based on the received voice information. This character string information, which includes the reserved word information (for example, "moving image") and the command information (for example, "search"), does not include the free word information. The replied character string information is received by recognition result acquirer 103, and is output to intention interpretation processor 104.

In this operation example, voice processor 102 of voice recognition processing apparatus 100 determines that the voice information based on the voice uttered by user 700 includes the command "search". Then, voice processor 102 outputs the command information corresponding to the command "search" to recognition result acquirer 103. In addition, recognition result acquirer 103 receives the character string information that includes the character string of "moving image" from voice recognizer 50. Then, intention interpretation processor 104 determines that "moving image" included in the character string information acquired from recognition result acquirer 103 is a reserved word. In addition, since the character string information does not include the free word information, intention interpretation processor 104 does not output the free word information.

Based on a processing result in step S201, intention interpretation processor 104 determines whether the reserved word information is included in the character string information (step S202).

When it is determined in step S202 that the reserved word information is not included (No), the processing goes to step S205. The operation after step S205 will be described later.

When it is determined in step S202 that the reserved word information is included (Yes), word storage processor 105 stores the reserved word information (for example, "moving image") in storage device 170 as new content to be searched (step S203).

Since the new reserved word information is stored in storage device 170, the reserved word information is updated. In the aforementioned example, the previous reserved word information "image" is switched to the new reserved word information "moving image" (step S204).

Since the free word information is not output from intention interpretation processor 104 in this operation example, word storage processor 105 reads the free word information (for example, "ABC") stored in storage device 170, and outputs the free word information to command processor 106. Command processor 106 receives the command information from intention interpretation processor 104, and receives the read free word information and new reserved word information from word storage processor 105. Then, command processor 106 performs command processing according to the command information on the read free word information and new reserved word information (step S208). It is to be noted that, as described above, command processor 106 mainly performs command processing other than search.

When the command information includes "search", search processor 107 performs search processing (step S209). In the aforementioned example, search processor 107 determines "moving image" as content to be searched based on the new reserved word information "moving image", and performs moving-image search using the free word information "ABC" that is read from storage device 170.

The search result in step S209 is displayed on display device 140 by display controller 108. In this way, the keyword associative search processing is completed.

Subsequently, the keyword associative search processing when it is determined in step S202 that the reserved word information is not included (No) will be described.

The keyword associative search processing will be described below with reference to specific examples. It is assumed here that user 700 has first uttered, "Search for image of ABC", and a search for "image" with the free word "ABC" has already been performed.

It is assumed that subsequently user 700 performs a search for "image" using a free word of "XYZ" different from the free word used for the last image search. In this case, in the present exemplary embodiment, user 700 may omit utterance of the reserved word "image" and command "search" that overlap with the words in the previous search. That is, user 700 just needs to utter, "XYZ."

Detailed description of steps S201 and S202, which is overlapping, will be omitted.

The voice information (for example, "XYZ") based on the voice uttered by the user is transmitted from voice recognition processing apparatus 100 via network 40 to voice recognizer 50. Voice recognizer 50 replies the character string information based on the received voice information. This character string information, which includes the free word information (for example, "XYZ"), does not include the reserved word information and the command information. The replied character string information is received by recognition result acquirer 103, and is output to intention interpretation processor 104.

In this way, in this operation example, the character string information does not include the reserved word information, and the command information is not output from voice processor 102. Therefore, the reserved word information and the command information are not output from intention interpretation processor 104.

Accordingly, it is determined in step S202 that the reserved word information is not included (No). Based on a processing result in step S201, intention interpretation processor 104 determines whether the free word information is included in the character string information (step S205).

When it is determined in step S205 that the free word information is not included (No), the processing goes to step S208.

When it is determined in step S205 that the free word information is included (Yes), word storage processor 105 stores the free word information (for example, "XYZ") in storage device 170 as new free word information (step S206).

Since the new free word information is stored in storage device 170, the free word information is updated. In the aforementioned example, the previous free word information "ABC" is switched to the new free word information "XYZ" (step S207).

Since the reserved word information and command information are not output from intention interpretation processor 104 in this operation example, word storage processor 105 reads the reserved word information (for example, "image") and command information (for example, "search") stored in storage device 170, and outputs the reserved word information and command information to command processor 106. Command processor 106 receives the reserved word information and command information that word storage processor 105 reads from storage device 170, and the new free word information (for example, "XYZ"). Then, command processor 106 performs command processing according to the read command information on the read reserved word information and new free word information (step S208).

When the command information that is read from storage device 170 includes "search", search processor 107 performs search processing (step S209). In the aforementioned example, search processor 107 determines "image" as content to be searched based on the new reserved word information "image" that is read from storage device 170, and performs image search using the new free word information "XYZ".

The search result in step S209 is displayed on display device 140 by display controller 108. In this way, the keyword associative search processing is completed.

It is to be noted that, when it is determined in step S205 that the free word information is not included (No), search processor 107 goes to step S208 and performs normal command processing or search processing.

[1-3. Effect and Others]

As described above, in the present exemplary embodiment, voice recognition processing apparatus 100 includes voice acquirer 101, voice processor 102 that is an example of the first voice recognizer, voice recognizer 50 that is an example of the second voice recognizer, intention interpretation processor 104 that is an example of the sorter, storage device 170, and command processor 106 and search processor 107 that are examples of the processor. Voice acquirer 101 is configured to acquire the voice uttered by the user and to output the voice information. Voice processor 102 is configured to convert the voice information into the command information that is an example of the first information. Voice recognizer 50 is configured to convert the voice information into the character string information that is an example of the second information. Intention interpretation processor 104 is configured to sort the reserved word information that is an example of the third information and the free word information that is an example of the fourth information, from the character string information. Storage device 170 is configured to store the command information, the reserved word information, and the free word information. Command processor 106 is configured to perform processing based on the command information, the reserved word information, and the free word information. Then, command processor 106 and search processor 107 are configured, when there are one or two pieces of missing information in the command information, the reserved word information, and the free word information, to complement the missing information using information stored in storage device 170, and to perform processing.

Search processor 107 is configured, when the first information is a search command, to perform search processing based on the search command, the reserved word information, and the free word information.

Voice recognizer 50 may be installed on network 40, and voice recognition processing apparatus 100 may include transmitter-receiver 150 configured to communicate with voice recognizer 50 via network 40.

Voice processor 102 may be configured to convert the voice information into the command information by using the preset "voice-command" association information that associates the plurality of pieces of command information with the voice information.

When performing voice operations continuously, user 700 who uses voice recognition processing apparatus 100 configured in this way can perform a new operation based on previously uttered information and new information to utter, without uttering again information uttered in previous voice operation. For example, when performing search processing continuously, user 700 can perform a new search based on the previously uttered information and the information to newly utter, without uttering again the information that is input by voice operation in the previous search.

As a specific example, when uttering, "Search for image of ABC", searching for "image" with the free word "ABC", and subsequently performing "Search for moving image of ABC", user 700 may omit utterance of the free word "ABC" that overlaps with words in the previous search, and may only utter, "Search for moving image". This makes it possible to perform search processing identical to search processing performed at a time of uttering, "Search for moving image of ABC".

Alternatively, when uttering, "Search for image of ABC", searching for "image" with the free word "ABC", and subsequently performing "Search for image of XYZ", user 700 may omit utterance of the reserved word "image" and command "search" that overlap with words in the previous search, and may only utter, "XYZ". This makes it possible to perform search processing identical to search processing performed at a time of uttering, "Search for image of XYZ".

In this way, voice recognition processing apparatus 100 according to the present exemplary embodiment can reduce complicatedness when user 700 performs voice operation, and can improve operativity.

Other Exemplary Embodiments

As described above, the first exemplary embodiment has been described as an example of a technique disclosed in the present application. However, the technique in the present disclosure is not limited to this example, and can be applied to exemplary embodiments to which change, replacement, addition, and omission have been made. In addition, it is also possible to make a new exemplary embodiment by combining elements described in the above-described first exemplary embodiment.

Therefore, other exemplary embodiments will be described below.

While the first exemplary embodiment has described an operation example when command information is "search", examples of other commands will be described here. Command information corresponding to voice information may be registered in "voice-command" association information, such as "channel up", "voice up", "playback", "stop", "change word", and "display character" for example.

For example, it is assumed that a user utters, "Playback optical disc". In this case, voice recognition processing apparatus 100 recognizes voices of a free word "optical disc" and command information "playback". This causes an optical disc playback apparatus that incorporates voice recognition processing apparatus 100 to play an image recorded on the optical disc. Subsequently, when user 700 utters, "Stop", voice recognition processing apparatus 100 recognizes a voice of command information "stop", and the optical disc playback apparatus stops playback of the optical disc. This is because word storage processor 105 stores the free word "optical disc" in storage device 170, and because command processor 106 performs processing of the command information "playback" that is newly input, on the free word "optical disc" read from storage device 170. That is, user 700 can control an operation of the optical disc playback apparatus by only uttering, "stop" without uttering, "Stop optical disc".

In another example, for example, it is assumed that user 700 utters, "Display Japanese characters". In this case, voice recognition processing apparatus 100 recognizes the voices of free word information "Japanese" and command information "Display characters". This causes television 10 that incorporates voice recognition processing apparatus 100 to execute a command "Display characters" for displaying Japanese subtitles on display device 140 of television 10. Subsequently to this state, when user 700 utters, "English", voice recognition processing apparatus 100 recognizes a voice of free word information "English". Then, television 10 reads the command information "Display characters" from storage device 170, continues the operation of "Display characters", and alters characters to be displayed on display device 140 from "Japanese" into "English". That is, user 700 can alter the display characters on television 10 from "Japanese" into "English" only by uttering, "English" without uttering, "Display English characters".

In this way, when voice information includes missing information, voice recognition processing apparatus 100 reads the missing information from storage device 170 for a complement, and performs command processing. Thus, user 700 does not need to repeat utterance of a word that overlaps a word uttered during the previous voice operation, and complexity during voice operations is relieved and operativity improves.

While utterances of user 700 do not include a reserved word in the two examples described above, command processor 106 can perform command processing of the examples. In this way, when command information can be performed even if a reserved word or a free word is not included, intention interpretation processor 104 informs word storage processor 105 and command processor 106 (search processor 107) that a reserved word or a free word does not need to be included. Therefore, based on information informed from intention interpretation processor 104, command processor 106 (search processor 107) can perform command processing, by determining whether to perform command processing in combination of free word information, reserved word information, and command information, whether to perform command processing in combination of free word information and command information, or whether to perform command processing in combination of reserved word information and command information. In addition, word storage processor 105 prevents an operation of reading unnecessary information from storage device 170. In the aforementioned examples in which the voice information does not include reserved word information, since the reserved word information is unnecessary, word storage processor 105 does not read the reserved word information from storage device 170.

It is to be noted that, in association with command information, information that indicates whether processing of the command requires both a reserved word and a free word, or requires only either one, may be registered previously in the "voice-command" association information. Then, voice processor 102 may operate to output this information along with the command information to downstream stages.

While the present exemplary embodiment has described the operation examples of searching for "image" and "moving image", objects of search are not limited to "image" or "moving image", and may be a program guide or a recorded program.

Although not particularly mentioned in the present exemplary embodiment, in voice recognition processing, when the command information "search" and a keyword are included in a voice uttered by user 700 and a type of the "search" is a search using an Internet search application, voice recognition processing apparatus 100 performs the search with the keyword by using the Internet search application. For example, when user 700 utters, "Search for ABC over the Internet", voice recognition processing apparatus 100 recognizes that the voice "Search over the Internet" is "search" using the Internet search application. Therefore, user 700 only needs to utter the voice to cause television 10 to perform the Internet search with the keyword.

In voice recognition processing, when the command information "search" and a keyword are included in a voice uttered by user 700 and a type of the "search" is a search using a program guide application, voice recognition processing apparatus 100 performs the search with the keyword by using the program guide application. For example, when user 700 utters, "Search for ABC by program guide", voice recognition processing apparatus 100 recognizes that the voice "Search by program guide" is "search" using the program guide application. Therefore, user 700 only needs to utter the voice to cause television 10 to perform the program guide search with the keyword.

In addition, in voice recognition processing, when the command information "search" and a free word are included but reserved word information is not included in a voice uttered by user 700, voice recognition processing apparatus 100 may perform the "search" with the free word by using all the applications that include the free word, and may display a search result of all the applications by which the search is performed on display device 140.

It is to be noted that, in television 10, voice recognition processing can be started by the aforementioned method. Therefore, after voice recognition processing is started, user 700 can perform the above search even while watching a program on television 10.

While the example in which voice recognizer 50 is disposed on network 40 has been described in the present exemplary embodiment, voice recognizer 50 may be included in voice recognition processing apparatus 100.

The present exemplary embodiment has described the operation example of reading free word information from storage device 170 to complement command processing and the operation example of reading reserved word information and command information from storage device 170 to complement command processing. However, the present disclosure is not limited to this configuration. For example, the reserved word information may be read from storage device 170 to complement command processing, and the command information may be read from storage device 170 to complement command processing. Alternatively, the reserved word information and free word information may be read from storage device 170 to complement command processing, and the free word information and command information may be read from storage device 170 to complement command processing.

Each block illustrated in FIG. 2 may be configured as an independent circuit block, and may be configured such that a processor may execute software that is programmed to implement an operation of each block.

INDUSTRIAL APPLICABILITY

The present disclosure is applicable to devices that perform processing operations instructed by users. Specifically, the present disclosure is applicable to devices such as a mobile terminal device, a television receiver, a personal computer, a set top box, a VCR, a game machine, a smart phone, and a tablet terminal.

REFERENCE MARKS IN THE DRAWINGS

10: television receiver
11: voice recognition processing system
20: remote controller
21, 31: microphone
22, 32: input unit
30: mobile terminal
40: network
50: voice recognizer
100: voice recognition processing apparatus
101: voice acquirer
102: voice processor
103: recognition result acquirer
104: intention interpretation processor
105: word storage processor
106: command processor
107: search processor
108: display controller
110: operation acceptor
130: built-in microphone
140: display device
150: transmitter-receiver
160: tuner
170,171: storage device
180: wireless communicator
201: voice recognition icon
202: indicator
700: user

The invention claimed is:

1. A voice recognition processing apparatus comprising:
 a voice acquirer configured to acquire a voice uttered by a user and to output voice information;

a first voice recognizer configured to convert the voice information into command information representing a preset command by performing command recognition processing for determining whether the voice information includes the preset command and for specifying the preset command;

a second voice recognizer configured to convert the voice information into character string information by performing dictation in accordance with the voice information;

a sorter configured to sort reserved word information, the reserved word being a previously determined word from the character string information, and free word information from a remaining portion of the character string information;

a storage device configured to store the command information, the reserved word information, and the free word information; and a processor configured to perform processing based on the command information, the reserved word information and the free word information, wherein the processor is configured to compensate for missing information by using information stored in the storage device to perform processing when there are one or two pieces of the missing information in the command information, the reserved word information and the free word information.

2. The voice recognition processing apparatus according to claim 1, wherein the processor is configured, when the command information is a search command, to perform search processing based on the search command.

3. The voice recognition processing apparatus according to claim 1, further comprising a transmitter-receiver configured to communicate with the second voice recognizer via a network,
wherein the second voice recognizer is installed on the network.

4. The voice recognition processing apparatus according to claim 1, wherein the first voice recognizer is configured to use preset information that associates a plurality of pieces of the command information with the voice information to convert the voice information into the command information.

5. The voice recognition processing apparatus according to claim 1, wherein the processor is configured to complement the missing information by using information stored in the storage device to perform processing when there are one or two pieces of missing information in the command information, the reserved word information and the free word information, the missing information including the free word information.

6. A voice recognition processing method comprising:
acquiring a voice uttered by a user and converting the voice into voice information;
converting the voice information into command information representing a preset command by performing command recognition processing for determining whether the voice information includes the preset command and for specifying the preset command;
converting the voice information into character string information by performing dictation in accordance with the voice information;
sorting reserved word information, the reserved word being a previously determined word from the character string information and free word information from a remaining portion of the character string information;

storing the command information, the reserved word information and the free word information in a storage device;

performing processing based on the command information, the reserved word information and the free word information; and compensating for missing information by using information stored in the storage device when there are one or two pieces of the missing information in the command information, the reserved word information and the free word information.

7. The voice recognition processing method according to claim 6, wherein in the complementing of the missing information, the missing information is complemented by using information stored in the storage device to perform processing when there are one or two pieces of missing information in the command information, the reserved word information and the free word information, the missing information including the free word information.

8. A display apparatus comprising:
a voice acquirer configured to acquire a voice uttered by a user and to output voice information;
a first voice recognizer configured to convert the voice information into command information representing a preset command by performing command recognition processing for determining whether the voice information includes the preset command and for specifying the preset command;
a second voice recognizer configured to convert the voice information into character string information by performing dictation in accordance with the voice information;
a sorter configured to sort reserved word information, the reserved word being a previously determined word from the character string information and free word information from a remaining portion of the character string;
a storage device configured to store the command information, the reserved word information and the free word information;
a processor configured to perform processing based on the command information, the reserved word information and the free word information; and
a display device configured to display a result of the processing performed by the processor,
wherein the processor is configured to compensate for missing information by using information stored in the storage device to perform processing when there are one or two pieces of the missing information in the command information, the reserved word information and the free word information.

9. The display apparatus according to claim 8, wherein the processor is configured to complement the missing information by using information stored in the storage device to perform processing when there are one or two pieces of missing information in the command information, the reserved word information and the free word information, the missing information including the free word information.

* * * * *